(12) United States Patent
Kuczek et al.

(10) Patent No.: US 12,728,603 B2
(45) Date of Patent: Sep. 8, 2026

(54) COMPLIANT CONSOLIDATION BLOCK FOR CONTINUOUS WELDING OF POLYMER MATRIX COMPOSITES

(71) Applicant: Rohr Inc., Chula Vista, CA (US)

(72) Inventors: Andrzej E. Kuczek, Bristol, CT (US); Zhigang Wang, South Windsor, CT (US); John Joseph Gangloff, Middletown, CT (US); Wenping Zhao, Glastonbury, CT (US)

(73) Assignee: ROHR, INC., Chula Vista, CA (US)

( * ) Notice: Subject to any disclaimer, the term of this patent is extended or adjusted under 35 U.S.C. 154(b) by 287 days.

(21) Appl. No.: 18/431,185

(22) Filed: Feb. 2, 2024

(65) Prior Publication Data

US 2025/0249642 A1 Aug. 7, 2025

(51) Int. Cl.
*B29C 65/08* (2006.01)

(52) U.S. Cl.
CPC .................................... *B29C 65/08* (2013.01)

(58) Field of Classification Search
CPC ................................ B29C 65/02; B29C 65/08
See application file for complete search history.

(56) References Cited

U.S. PATENT DOCUMENTS

| | | | |
|---|---|---|---|
| 4,744,431 A | 5/1988 | Stoellinger | |
| 9,238,338 B2 | 1/2016 | Wilkerson et al. | |
| 10,016,931 B2 | 7/2018 | Kurtz et al. | |
| 11,524,467 B2 | 12/2022 | DiChiara | |
| 11,524,471 B2 | 12/2022 | Prebil et al. | |
| 11,633,927 B2 | 4/2023 | Wadsworth | |
| 2023/0031155 A1 | 2/2023 | Zhao et al. | |
| 2023/0211565 A1 | 7/2023 | Lechner et al. | |
| 2024/0217184 A1* | 7/2024 | Shen | B29C 66/1122 |

FOREIGN PATENT DOCUMENTS

| | | |
|---|---|---|
| WO | 2011067470 | 6/2011 |

OTHER PUBLICATIONS

European Patent Office, European Search Report dated May 8, 2025 in Application No. 24215489.6.

* cited by examiner

*Primary Examiner* — Yunju Kim
(74) *Attorney, Agent, or Firm* — SNELL & WILMER L.L.P.

(57) ABSTRACT

A compliant consolidation block is provided. The compliant consolidation block includes a non-articulating component, a first articulating self-aligning component coupled to the non-articulating component, and two second articulating self-aligning components coupled to the first articulating self-aligning component. The first articulating self-aligning component is configured to articulate with respect to the non-articulating component. Each of the two second articulating self-aligning components are individually configured to articulate with respect to the first articulating self-aligning component.

18 Claims, 6 Drawing Sheets

214

308
306
310
302
304
314
316
318
312
322
324
320
326
228
204
202

214
406

214
404
406
402

214
404
402

COMPLIANT CONSOLIDATION BLOCK FOR CONTINUOUS WELDING OF POLYMER MATRIX COMPOSITES

GOVERNMENT LICENSE RIGHTS

The government has rights in this application under Gov. Contract No. W911NF-17-3-0004 (Sub: ARM-TEC-22-01-F-03).

FIELD

The present disclosure generally relates to the field of aerostructures and, more particularly, to a compliant consolidation block for continuous welding of polymer matrix composites for use in aerostructures.

BACKGROUND

An aircraft may include several aerostructures including a fuselage, interior parts, wings, a tail assembly, and nacelles, among others. Flight control surfaces, such as the wings and the tail, are configured to affect the yaw, roll and pitch of the aircraft during flight. Such flight control surfaces may include, for example, ailerons to affect the roll about a longitudinal axis, a rudder to affect the yaw about a vertical axis and an elevator to affect the pitch about a lateral axis, each axis being with respect to a coordinate system associated with the aircraft. Additional flight control surfaces include trailing edge flaps configured to affect the lift of a wing, leading edge slats configured to affect the stall speed of a wing and spoilers, generally located adjacent to and forward of the trailing edge flaps and configured to disrupt the airflow over a wing surface to reduce lift or to increase drag. Flight control surfaces are typically airfoil-like components configured to alter the flow of air about the wings or tail structure of the aircraft. Aerostructures, such as the fuselage and nacelles are configured to protect other structures, such as internal portions of the aircraft and the engines, respectively. Notwithstanding the simple shapes, aerostructures should possess sufficient structural integrity to withstand the forces applied during use over the operational life of the aircraft. Aerostructure exhibiting low weight and high strength may be fabricated thermoplastic materials. Thermoplastic polymer materials or thermoplastic composite materials are increasingly being used in various aerospace applications for the combination of benefits as light weight, high toughness, no storage time limit at room temperature, fast fabrication, fast assembly and suitable for automated manufacturing.

SUMMARY

According to various embodiments of the present disclosure, a compliant consolidation block is provided. The compliant consolidation block includes a non-articulating component, a first articulating self-aligning component coupled to the non-articulating component, and two second articulating self-aligning components coupled to the first articulating self-aligning component. The first articulating self-aligning component is configured to articulate with respect to the non-articulating component. Each of the two second articulating self-aligning components are individually configured to articulate with respect to the first articulating self-aligning component.

In various embodiments, a first force applied by the non-articulating component is divided by the first articulating self-aligning component such that a second force is applied to each of the second articulating self-aligning components, the second force being half of the first force.

In various embodiments, each of the second articulating self-aligning components apply the second force as a consolidation pressure distribution in order to consolidate a first polymer composite component and a second polymer composite component into one component.

In various embodiments, the first articulating self-aligning component is coupled to the non-articulating component via a pin that is configured to slide within the confines of voids in the non-articulating component.

In various embodiments, the non-articulating component includes a recess. In various embodiments, the first articulating self-aligning component comprises a protruding portion. In various embodiments, the protruding portion of the first articulating self-aligning component is received within the recess of the non-articulating component.

In various embodiments, the pin protrudes through a first of the voids, through the protruding portion of the first articulating self-aligning component, and through a second of the voids.

In various embodiments, each of the second articulating self-aligning components are individually coupled to the first articulating self-aligning component via a pin that is configured to slide within the confines of voids in the first articulating self-aligning component.

In various embodiments, the first articulating self-aligning component includes a recess for each of the second articulating self-aligning components. In various embodiments, each of the second articulating self-aligning components comprise a protruding portion. In various embodiments, the protruding portion of each of the second articulating self-aligning components is received within a respective recess of the first articulating self-aligning component.

In various embodiments, the compliant consolidation block further includes two third articulating self-aligning components coupled to each of the two second articulating self-aligning components. In various embodiments, each of the third articulating self-aligning components are individually configured to articulate with respect to a respective second articulating self-aligning component.

In various embodiments, the second first force applied by the first articulating self-aligning component is divided by each of the second articulating self-aligning components such that a third force is applied to each of the third articulating self-aligning components, the third force being half of the second force or a quarter of the first force.

Also disclosed here in an ultrasonic welder. The ultrasonic welder includes a roller; a sonotrode; and a compliant consolidation block. The compliant consolidation block includes a non-articulating component, a first articulating self-aligning component coupled to the non-articulating component, and two second articulating self-aligning components coupled to the first articulating self-aligning component. The first articulating self-aligning component is configured to articulate with respect to the non-articulating component. Each of the two second articulating self-aligning components are individually configured to articulate with respect to the first articulating self-aligning component.

In various embodiments, a first force applied by the non-articulating component is divided by the first articulating self-aligning component such that a second force is applied to each of the second articulating self-aligning components, the second force being half of the first force.

In various embodiments, each of the second articulating self-aligning components apply the second force as a consolidation pressure distribution in order to consolidate a first polymer composite component and a second polymer composite component into one component.

In various embodiments, the first articulating self-aligning component is coupled to the non-articulating component via a pin that is configured to slide within the confines of voids in the non-articulating component.

In various embodiments, the non-articulating component includes a recess. In various embodiments, the first articulating self-aligning component comprises a protruding portion. In various embodiments, the protruding portion of the first articulating self-aligning component is received within the recess of the non-articulating component.

In various embodiments, the pin protrudes through a first of the voids, through the protruding portion of the first articulating self-aligning component, and through a second of the voids.

In various embodiments, each of the second articulating self-aligning components are individually coupled to the first articulating self-aligning component via a pin that is configured to slide within the confines of voids in the first articulating self-aligning component.

In various embodiments, the first articulating self-aligning component includes a recess for each of the second articulating self-aligning components. In various embodiments, each of the second articulating self-aligning components comprise a protruding portion. In various embodiments, the protruding portion of each of the second articulating self-aligning components is received within a respective recess of the first articulating self-aligning component.

In various embodiments, the compliant consolidation block further includes two third articulating self-aligning components coupled to each of the two second articulating self-aligning components. In various embodiments, each of the third articulating self-aligning components are individually configured to articulate with respect to a respective second articulating self-aligning component.

In various embodiments, the second first force applied by the first articulating self-aligning component is divided by each of the second articulating self-aligning components such that a third force is applied to each of the third articulating self-aligning components, the third force being half of the second force or a quarter of the first force.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

Figures 1A, 1B:
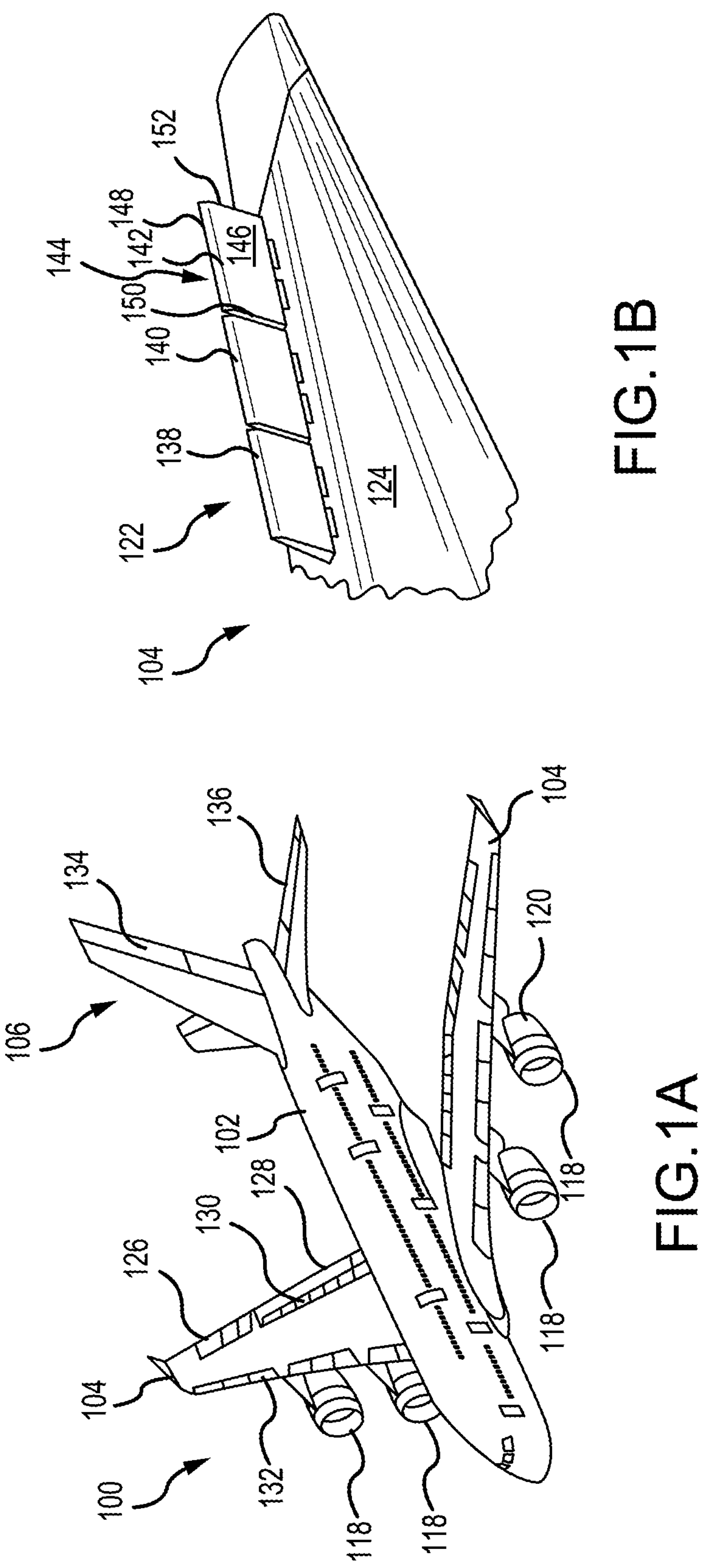
FIGS. 1A and 1B illustrate an aircraft, in accordance with various embodiments.

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an," or "the" may include one or more than one and that reference to an item in the singular may also include the item in the plural. Further, all ranges may include upper and lower values and all ranges and ratio limits disclosed herein may be combined.

Polymer matrix composites (PMCs) are used in a wide range of applications due to their superior mechanical properties, lightweight, and corrosion resistance. However, joining thermoplastic composites (TPCs), which are a sub-class of PMCs, is a challenging task due to a high melting temperature and low thermal conductivity of the PMCs. Welding is an emerging technology that has gained attention in recent years because of its ability to join PMCs effectively. While the illustrative embodiments hereafter refer to ultrasonic welding, the illustrative embodiments are not limited only to ultrasonic welding. That is, any type of welding, such as ultrasonic welding, induction welding, or resistance welding, among others, may be utilized without departing from the spirit and scope of the invention.

In various embodiments, ultrasonic welding has many applications in various industries, including aerospace, automotive, medical, and consumer goods. In various embodiments, the aerospace industry may use continuous ultrasonic welding to join composite panels and components, which offer excellent strength and fatigue resistance. In various embodiments, automotive companies use ultrasonic welding to fabricate lightweight and strong parts, such as bumpers, instrument panels, and door panels. In the medical industry, ultrasonic welding is used to bond and seal medical devices, such as catheters, drug delivery systems, and surgical instruments. In the consumer goods industry, ultrasonic welding is used to fabricate electronic components, like sensors, actuators, and circuit boards. While the illustrative embodiments hereafter refer to aerospace applications, the aerospace applications are only utilized as an example and the illustrative embodiments are not limited only to aerospace applications.

In various embodiments, the key welding parameters, such as vibration frequency, amplitude, speed, time, and applied pressure are important to achieve a high-quality weld. In various embodiments, after heat is generated via ultrasonic energy, consolidation pressure is used to maintain weld line fiber stability while the thermoplastic matrix is cooled and a solid weld is created. In various embodiments, if there is not sufficient consolidation pressure and/or time provided to the joint to cool the matrix below its glass transition temperature, there is a risk of weld line fiber deconsolidation, which may degrade the desired mechanical property of the weld. In various embodiments, physically, the continuous application of the consolidation pressure is provided by a consolidation block trailing the sonotrode. In various embodiments, the consolidation time is proportional to the length of the consolidation block and the speed of the welding process. In various embodiments, the consolidation pressure is proportional to applied normal force to the consolidation block and the contact surface area of the consolidation block with the welded part.

In various embodiments, although it is relatively easy to apply uniform pressure to a flat surface, curved surfaces pose a challenge, especially when the curvature is not constant or, in more extreme cases, the curvature may change from positive to negative (convex vs. concave) or vice versa. In various embodiments, in such conditions, the contact length of the consolidation block with the welded material is reduced significantly, causing localized contact pressure to spike up and reduction in consolidation time.

In order to address these issues, in various embodiments, a compliant consolidation block is provided to achieve adequate microstructure, strength, and a high-quality surface of the welded joints. In various embodiments, the compliant consolidation block addresses the problem of the interaction between a flat, solid consolidation block and a curved surface of the welded component. In various embodiments, to achieve a relatively uniform consolidation pressure distribution on the contact surface, a fractal pattern may be utilized. In various embodiments, the compliant consolidation block includes multiple articulating self-aligning components, allowing for high compliancy and the ability to adapt to the curvature of a welded part. Additionally, in various embodiments, the compliant consolidation block may smoothly transition from a concave to a convex profile seamlessly. In various embodiments, the individual elements of the consolidation block interact through half-round interfaces. In various embodiments, a center of rotation of each interface aligns with the surface of the welded part, thereby improving self-alignment, stability, and minimizing a "digging in" effect caused by surface friction along the toolpath. In various embodiments, if desired, a pivot point of each of the multiple articulating self-aligning components may be realized below the surface of the welded material, resulting in a reversed moment caused by the friction force to uplift or unload the leading edge of the consolidation block to control the pressure distribution.

FIGS. 1A and 1B illustrate an aircraft, in accordance with various embodiments. Aircraft 100 includes a fuselage 102, a pair of wings 104, and a tail assembly 106. One or more propulsion systems 118 (e.g., a turbofan gas turbine engine with a nacelle assembly 120) may be coupled to the aircraft 100 (e.g., mounted on the underside of a wing 104). The propulsion systems 118 may be configured to provide at least one of forward thrust or propulsion for aircraft 100.

In various embodiments, the propulsion systems 118 may comprise an engine including a fan and an engine core, housed within a nacelle assembly 120. The typical nacelle assembly may comprise an inlet, a fan cowl, a thrust reverser, and an exhaust system. The nacelle assembly 120 surrounds the engine core providing smooth aerodynamic surfaces for airflow around and into the engine. The nacelle assembly 120 also helps define a bypass air duct through the propulsion systems 118. In various embodiments, the fan may draw and direct a flow of air into and through the propulsion systems 118. After the fan, the air is divided into two principal flow paths, one flow path through engine core (i.e., a "core airflow"), and another flow path through a bypass air duct (i.e., a "bypass airflow"). The engine core flow path is directed into the engine core and initially passes through a compressor that increases the air flow pressure, and then through a combustor where the air is mixed with fuel and ignited. The combustion of the fuel and air mixture causes a series of turbine blades at the rear of the engine core to rotate, and to drive the engine's compressor and fan. The high-pressure exhaust gases from the combustion of the fuel and air mixture are thereafter directed through an exhaust system aft of the engine for thrust.

The wings 104 include a plurality of spoilers 122 disposed along an upper surface 124 of the wing 104, with each of the plurality of spoilers 122 illustrated in a deployed position. The variety of control surfaces typically used on the wings 104 of the aircraft 100 may include, for example, an aileron 126, a trailing edge flap 128, a spoiler 130, disposed adjacent to and forward of the trailing edge flap 128, and a leading-edge slat 132. Similarly, the variety of control surfaces typically used on the tail assembly 106 of the aircraft 100 may include, for example, a rudder 134 and an elevator 136. While the foregoing description of the variety of control surfaces generally refers to each control surface as a single component, it will be appreciated that, in various embodiments, each individual component, e.g., the spoiler 130, may be a single component within a plurality of like components, e.g., the plurality of spoilers 122, as illustrated in FIG. 1B. For example, with reference to FIG. 1B, the plurality of spoilers 122 may, in various embodiments, include a first spoiler 138, a second spoiler 140, and a third spoiler 142. In various embodiments, each one of the plurality of spoilers 122 includes an upper surface 144 and a lower surface 146 opposite the upper surface 144, a trailing edge 148, and an inboard end 150 (or a first end), and an outboard end 152 (or a second end).

In various embodiments, aerostructures, such as those forming portions of a fuselage 102, wings 104, tail assembly 106, nacelle assemblies 120, and other structural components of aircraft 100, increasingly include polymer matrix composites (PMCs). Aircraft aerostructure materials utilized to form such aerostructures may be selected to provide suitable structural strength, rigidity, and impact resistance while also minimizing aerostructure weight. In particular, PMCs, which comprise thermoplastic composites (TPCs) and thermoset composites (TSCs). TPCs are increasingly being used for aerostructure parts due to their weldability potential in order to reduce aerostructure weight and manufacturing costs, for example, in comparison to conventional metal (e.g., aluminum) and thermoset materials.

Figure 2:
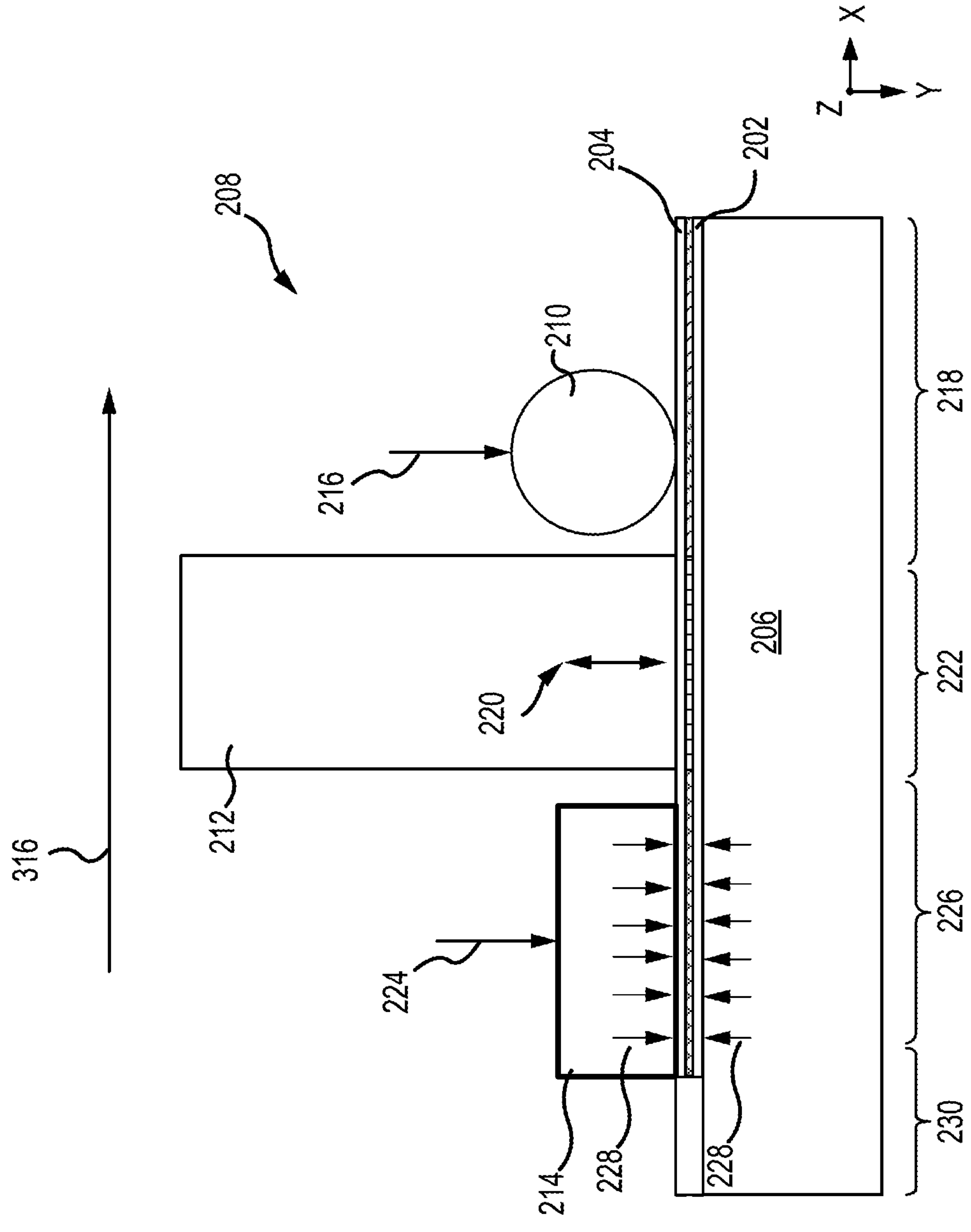
FIG. 2 illustrates a process of ultrasonically welding a first polymer composite component to a second polymer composite component, in accordance with various embodiments.

Referring now to FIG. 2, in accordance with various embodiments, a process of ultrasonically welding a first polymer composite component to a second polymer composite component is illustrated. In various embodiments, the first polymer composite component 202 and the second polymer composite component 204 may include a thermoplastic matrix and a fiber-reinforcement embedded within the thermoplastic matrix. In various embodiments, the thermoplastic matrix may include, but are not limited to, a semi-crystalline thermoplastic resin or an amorphous thermoplastic resin, among others. In various embodiments, the semi-crystalline thermoplastic resin may include polyethylene (PE), polypropylene (PP), polyester, polyoxymethylene (POM), polyamide (PA), polyarylenc sulfide, polyketone (PK), polyetherketone (PEK), polyether ether ketone (PEEK), polyether ketone (PEKK), polyvinylidene fluoride (PVDF), polytetrafluoroethylene (PTFE), polyaryletherketone (PAEK), polyether nitrile (PEN), fluororesin, or liquid crystal polymer (LCP). In various embodiments, the polyester may include polyethylene terephthalate (PET), polybutylene terephthalate (PBT), polytrimethylene terephthalate (PTT), polyethylene naphthalate (PEN), or liquid crystal polyester, among others. In various embodiments, the polyarylene sulfide may be polyphenylene sulfide (PPS). In various embodiments, the fluororesin may be polytetrafluoroethylene. In various embodiments, the amorphous thermoplastic resin may include polycarbonate (PC), polymethyl methacrylate (PMMA), acrylonitrile butadiene styrene (ABS), polystyrene (PS), styrene acrylonitrile resin (SAN), polyphenylene ether (PPE), polyimide (PI), polyamide imide (PAI), polyetherimide (PEI), polysulfone (PSU), polyether sulfone (PES), or polyarylate (PAR), among others. In various embodiments, the fiber-reinforcement may include a plurality of reinforcement fibers such as metal fibers/filaments, carbon fibers, insulating fibers, organic fibers, or inorganic fibers, among others. In various embodiments, the metal fibers/filaments may include aluminum fibers, brass fibers, or stainless-steel fibers, among others. In various embodiments, the carbon fibers may include graphite fibers such as polyacrylonitrile (PAN)-based carbon fibers, rayon-based carbon fibers, lignin-based carbon fibers, or pitch-based carbon fibers, among others. In various embodiments, a thickness of the first polymer composite component 202 and the second polymer composite component 204 may be between 0.05 inches (0.127 centimeter) and 0.25 inches (0.635 centimeter). In various embodiments, the thickness of the first polymer composite component 202 and the second polymer composite component 204 may be between 0.075 inches (0.1905 centimeter) and 0.15 inches (0.381 centimeter). In various embodiments, the thickness of the first polymer composite component 202 and the second polymer composite component 204 may preferably be 0.1 inches (0.254 centimeter). In various embodiments, another aspect of continuous ultrasonic welding is that an energy director material may be placed in between the two TPCs being welded. In various embodiments, the energy director is typically the same thermoplastic material as the constituent thermoplastic material in the TPC, but does not have to be. In various embodiments, the energy director may be different topologies (i.e., film, corrugated, mesh, etc.). In various embodiments, the function of the energy director is to localize heat generation under ultrasonic energy and melt to focus heating on the inner interfaces being welded together of the TPCs.

In various embodiments, the first polymer composite component 202 is positioned on a support structure 206 and the second polymer composite component 204 is positioned over the first polymer composite component 202. In various embodiments, an ultrasonic welder 208 is then positioned is over the second polymer composite component 204. In various embodiments, the ultrasonic welder 208 is a continuous ultrasonic welder that includes roller 210, a sonotrode (also referred to as a horn) 212, and a compliant consolidation block 214. In various embodiments, the roller 210 is configured to provide an applied force 216, i.e. a downward force in a negative y-direction, in a pre-weld zone 218, forcing the second polymer composite component 204 onto the first polymer composite component 202.

In various embodiments, the sonotrode 212 follows the roller 210 and is configured to weld the second polymer composite component 204 to the first polymer composite component 202. The terminology "weld" as well as "join" or "melt" are used interchangeably to mean the consolidation of thermoplastic material using heat and/or pressure or, as in the various embodiments, adhering the second polymer composite component 204 to the first polymer composite component 202 together to form a welded polymer composite component. In various embodiments, the sonotrode 212 emits high-frequency vibrations 220, in a heating zone 222, that melt the second polymer composite component 204 and the first polymer composite component 202 thereby welding the second polymer composite component 204 to the first polymer composite component 202. In various embodiments, common frequencies used in ultrasonic welding of polymer composites include, but are not limited to 20 kHz, 30 kHz, 35 kHz, or 40 kHz, among others. In various embodiments, the continuous ultrasonic welding includes the ultrasonic welder 208 traveling continuously, at a predetermined speed, in the x-direction, over the surface of the second polymer composite component 204 applying the ultrasonic vibrations to weld the second polymer composite component 204 to the first polymer composite component 202.

In various embodiments, the compliant consolidation block 214 follows the sonotrode 212 is configured to provide an applied force 224, i.e. a downward force in a negative y-direction, in a consolidation zone 226, onto the second polymer composite component 204 and thus, the first polymer composite component 202 thereby applying a consolidation pressure distribution 228 that consolidates the second polymer composite component 204 and the first polymer composite component 202 into one component in the fully consolidated zone 230.

Figure 3A:
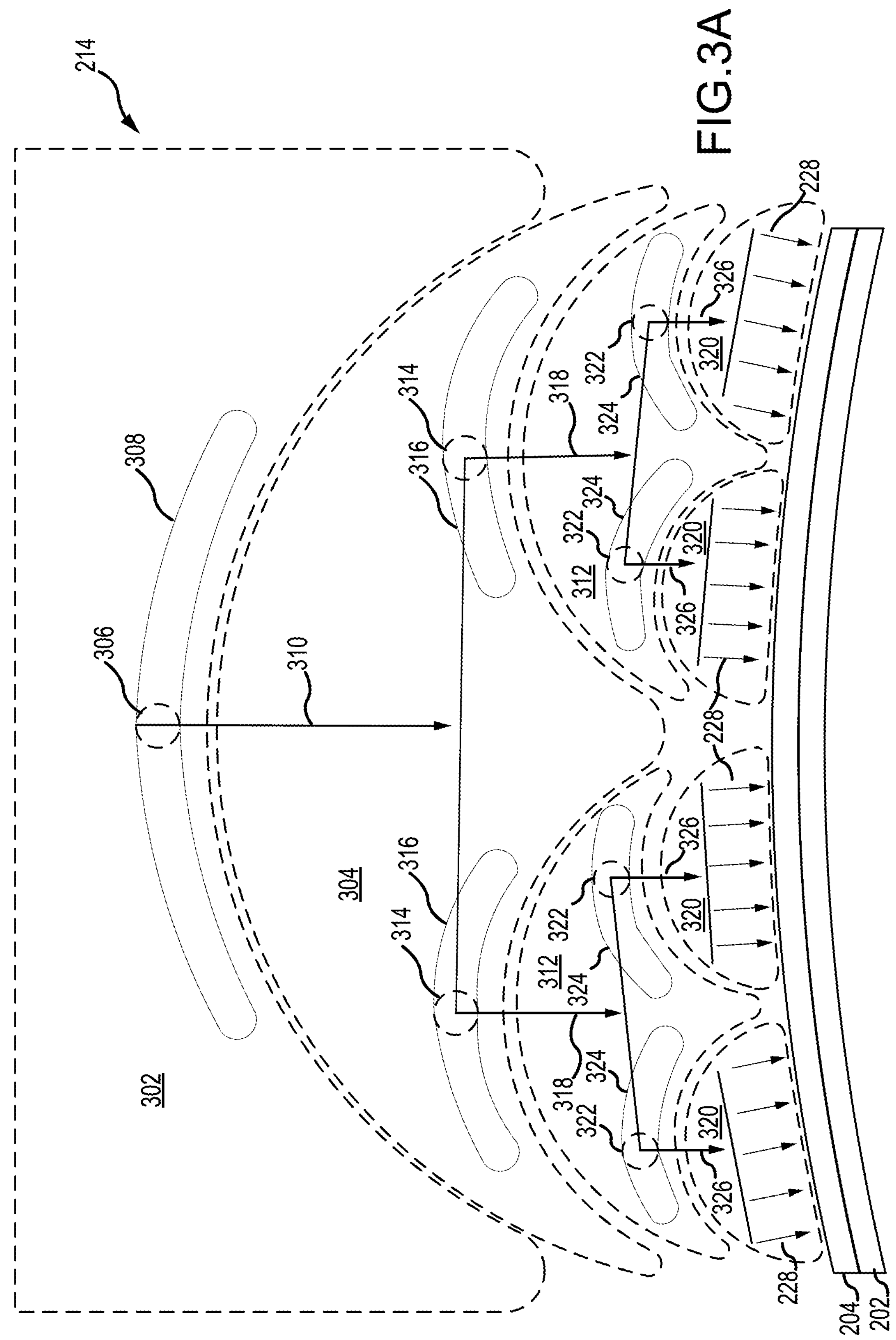
FIGS. 3A and 3B illustrate a front view and a side view, respectively, of a compliant consolidation block and forces applied by the compliant consolidation block, in accordance with various embodiments.
Figure 3B:
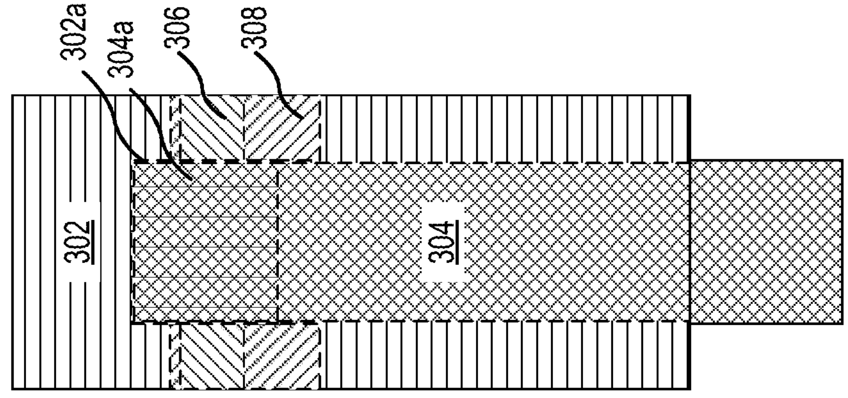

Referring now to FIGS. 3A and 3B, in accordance with various embodiments, a front view and a side view, respectively, of a compliant consolidation block and forces applied by the compliant consolidation block is illustrated. In order to address the issues of applying a consistent consolidation pressure when transition between at least two of a flat surface, a concave surface, and a convex surface, the compliant consolidation block 214 includes multiple articulating self-aligning pieces, allowing for high compliancy and the ability to adapt to the curvature of a welded part. With reference to FIG. 3A, in various embodiments, a non-articulating component 302 is coupled to a first articulating self-aligning component 304 such that the first articulating self-aligning component 304 is configured to articulate with respect to the non-articulating component 302. In that regard, the first articulating self-aligning component 304 is coupled to the non-articulating component 302 via a pin, clip, wire, or other protrusions, among others, hereinafter referred to pin 306, that is configured to slide within the confines of voids 308 in the non-articulating component 302. In various embodiments, pin 306 is provided to prevent the first articulating self-aligning component 304 from disengaging from the non-articulating component 302 when lifted. That is, pin 306 does not transfer any load during normal operation. In various embodiments, any forces transferred between the non-articulating component 302 and the first articulating self-aligning component 304 are transferred by bearing surfaces of the outer and inner curved surfaces of the non-articulating component 302 and the first articulating self-aligning component 304. Similar distinctions exist for pins 314 and pins 322 described hereafter.

In various embodiments, the non-articulating component 302 applies a first force 310 to the first articulating self-aligning component 304. With temporary reference to FIG. 3B, in various embodiments, the non-articulating component 302 includes a recess 302*a* in which a protruding portion 304*a* of the first articulating self-aligning component 304 is received. In various embodiments, the pin 306 protrudes through a first of the voids 308, through the protruding portion 304*a* of the first articulating self-aligning component 304, and then through a second of the voids 308, thereby coupling the first articulating self-aligning component 304 to the non-articulating component 302. A similar coupling exists between each second articulating self-aligning component and the first articulating self-aligning component as well as each third articulating self-aligning component and a respective second articulating self-aligning component, described hereafter.

Returning now to FIG. 3A, in various embodiments, two second articulating self-aligning components 312 are coupled to the first articulating self-aligning component 304 such that each of the two second articulating self-aligning components 312 are individually configured to articulate with respect to the first articulating self-aligning component 304. In that regard, the two second articulating self-aligning components 312 are coupled to the first articulating self-aligning component 304 via the pins, clips, wires, or other protrusions, among others, hereinafter referred to pins 314. In various embodiments, each of the pins 314 are configured to slide within the confines of a respective void 316 in the first articulating self-aligning component 304. In various embodiments, upon receiving the first force 310, the first articulating self-aligning component 304 applies second forces 318 to each of the second articulating self-aligning components 312. In various embodiments, the second forces 318 are each half of the first force 310.

In various embodiments, two third articulating self-aligning components 320 are coupled to each of the two second articulating self-aligning components 312 such that each of the third articulating self-aligning components 320 are individually configured to articulate with respect to a respective second articulating self-aligning component 312. In that regard, the two third articulating self-aligning components 320 are coupled to each of the two second articulating self-aligning components 312 via the pins, clips, wires, or other protrusions, among others, hereinafter referred to pins 322. In various embodiments, each of the pins 322 are configured to slide within the confines of a respective void 324 in the two second articulating self-aligning components 312. In various embodiments, upon receiving the second forces 318, each of the two second articulating self-aligning components 312 applies third forces 326 to each of the third articulating self-aligning components 320. In various embodiments, the third forces 326 are each half of the second forces 318 or a quarter of the first force 310. In various embodiments, each of the third articulating self-aligning components 320 are configured to apply their received third force 326 to the second polymer composite component 204 and the first polymer composite component 202 thereby applying a consolidation pressure distribution that consolidates the second polymer composite component 204 and the first polymer composite component 202 into one component.

In various embodiments, a radius of the articulating self-aligning components may vary between 0.125 inches (0.3175 centimeter) up to 5 inches (12.7 centimeters) depending on a curvature of the component that is to be welded. In various embodiments, while only three stages of articulating self-aligning component are illustrated in FIG. 3, more or fewer stages may be included, i.e. 2, 3, 4, 5, or 6 stages, among others. Furthermore, in various embodiments, a width of the compliant consolidation block 214 may be dependent on a width of the sonotrode 212, i.e. a ratio of 3:1 4:1, 5:1, or 6:1, among others. Thus, in various embodiments, if the sonotrode 212 is 2 inches (5.08 centimeters) wide, then the compliant consolidation block 214 would be 6 inches (15.24 centimeters) wide if a 3:1 ratio is utilized, 8 inches (20.32 centimeters) wide if a 4:1 ratio is utilized, 10 inches (25.4 centimeters) wide if a ratio of 5:1 is utilized, or 12 inches (30.48 centimeters) wide if a ratio of 6:1 is utilized.

Figures 4A, 4B, 4C:
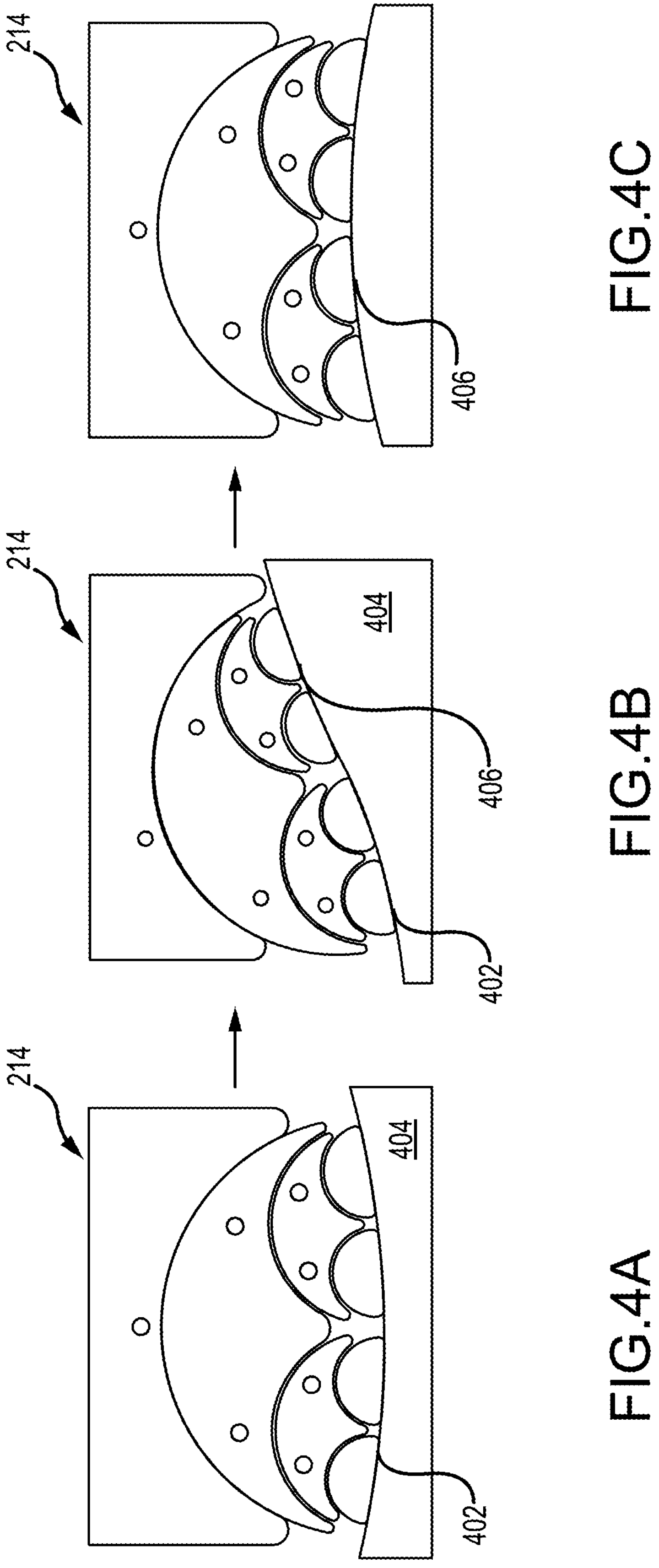
FIGS. 4A, 4B, and 4C illustrate a compliant consolidation block transitioning across various surfaces, in accordance with various embodiments.

Referring now to FIGS. 4A, 4B, and 4C, in accordance with various embodiments, a compliant consolidation block transitioning across various surfaces is illustrated. In various embodiments, as is illustrated in FIG. 4A, the compliant consolidation block 214 is traversing a concave surface 402. In various embodiments, each of the articulating self-aligning components, i.e. first articulating self-aligning component 304, second articulating self-aligning components 312, and third articulating self-aligning components 320 of FIG. 3, articulate so as to allowing for high compliancy and the ability to adapt to the curvature of the welded part 404. In various embodiments, as is illustrated in FIG. 4B, the compliant consolidation block 214 is transitioning through an inflection point between the concave surface 402 and a convex surface 406 of the welded part 404. In various embodiments, each of the articulating self-aligning components of the compliant consolidation block 214 smoothly and seamlessly transition from the concave surface 402 and the convex surface 406. In that regard, in various embodiments, the half-round interfaces of the articulating self-aligning components smoothly and seamlessly interact with each other. In various embodiments, as is illustrated in FIG. 4B, the compliant consolidation block 214 is traversing the convex surface 406.

Figure 5C:
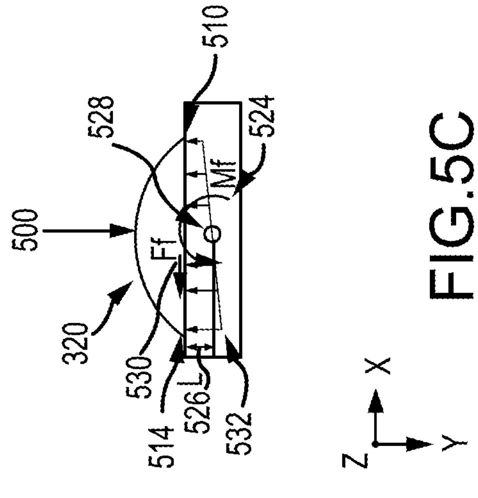
FIGS. 5A, 5B, and 5C illustrate a change in a pressure distribution due to friction force and a change of the position of the pivot point, in accordance with various embodiments.
Figure 5B:
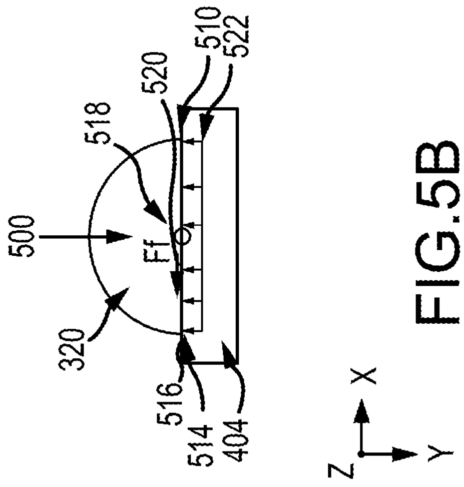
Figure 5A:
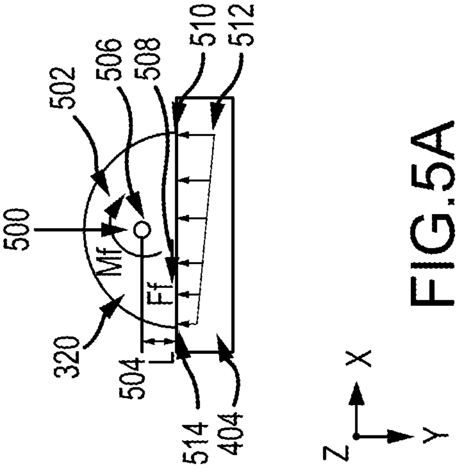

Referring now to FIGS. 5A, 5B, and 5C, in accordance with various embodiments, a change in a pressure distribution due to friction force and a change of the position of the pivot point is illustrated. In various embodiments, a center of rotation of each interface aligns with the surface of the welded part, improving self-alignment, stability, and minimizing a "digging in" effect caused by surface friction along the toolpath. In various embodiments, when the center of rotation is aligned with the weld line, the pressure is uniformly distributed. In various embodiments, the "digging in" effect is less pronounced than in case where the pivot point is above the weld line, but the pressure on the leading edge of component 320 is greater than in case when the pivot point is below the weld line. In that regard, in various embodiments, a pivot point of each of the third articulating self-aligning components 320 may be, depending on the amount of force applied to the third articulating self-aligning components 320, realized either above the surface of the welded part 404, at the surface of the welded part 404, or below the surface of the welded part 404.

In various embodiments, as is illustrated in FIG. 5A, an induced moment by friction force (Mf) 502 is determined by multiplying a moment arm (L) 504, i.e. a distance between the surface of the welded part 404 and a block pivot point 506 above the surface, by the friction force (Ff) 508 caused by the applied consolidation force 500 (third force 326 of FIG. 3), i.e., Mf=L*Ff, which is a positive force and which causes the leading edge 510 of the third articulating self-aligning component 320 to be forced downward, i.e. in a negative y-direction. Accordingly, as is illustrated in FIG. 5A, the consolidation pressure distribution 512 is greater at the leading edge 510 than at the trailing edge 514.

In various embodiments, as is illustrated in FIG. 5B, no induced moment by friction force (Mf) is present because no moment arm is present. That is, because the moment arm (L) 516 is at the surface of the welded part 404 and the block pivot point 518 is at the surface of the welded part 404, regardless of the by the friction force (Ff) 520 caused by the applied consolidation force 500, no induced moment by friction force (Mf) is present, i.e., Mf=0*Ff, which causes the third articulating self-aligning component 320 to be forced downward equally across the surface, i.e. in a negative y-direction. Accordingly, as is illustrated in FIG. 5B, the consolidation pressure distribution 522 is equal from the leading edge 510 to the trailing edge 514.

In various embodiments, as is illustrated in FIG. 5C, an induced moment by friction force (Mf) 524 is determined by multiplying a moment arm (L) 526, i.e. a distance between the surface of the welded part 404 and a block pivot point 528 below the surface, by the friction force (Ff) 530 caused by the applied consolidation force 500, i.e., Mf=−L*Ff, which is a negative force and which causes the trailing edge 514 of the third articulating self-aligning component 320 to be forced downward, i.e. in a negative y-direction. Accordingly, as is illustrated in FIG. 5C, the consolidation pressure distribution 532 is greater at the trailing edge 514 than at the leading edge 510. In various embodiments, by placing the center of rotation below the surface of the welded part 404, a reversed moment is caused by the friction force that uplifts or unloads the leading edge 510 of third articulating self-aligning components 320 to control pressure distribution.

Thus, in various embodiments, the described compliant consolidation block is self-adapting to a variable curvature from concave to convex without additional adjustments. In various embodiments, an adaptive pressure distribution may be provided by positioning the pivot point of each component to improve the weld properties and surface integrity. In various embodiments, the compliant consolidation block is a universal tool with straightforward construction design, feasible to be scaled up or scaled down depending on the actual weld size.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods, and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about," or "approximately" as used herein represent an amount close to the stated amount that still performs a desired function or achieves a desired result. For example, the term "substantially," "about," or "approximately" may refer to an amount that is within 10% of, within 5% of, within 1% of, within 0.1% of, and within 0.01% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above-described concepts can be used alone or in combination with any or all of the other above-described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A compliant consolidation block comprising:

a non-articulating component;

a first articulating self-aligning component coupled to the non-articulating component, wherein the first articulating self-aligning component is configured to articulate with respect to the non-articulating component and wherein the first articulating self-aligning component is coupled to the non-articulating component via a pin that is configured to slide within the confines of voids in the non-articulating component; and two second articulating self-aligning components coupled to the first articulating self-aligning component, wherein each of the two second articulating self-aligning components are individually configured to articulate with respect to the first articulating self-aligning component.

2. The compliant consolidation block of claim 1, wherein a first force applied by the non-articulating component is divided by the first articulating self-aligning component such that a second force is applied to each of the second articulating self-aligning components, the second force being half of the first force.

3. The compliant consolidation block of claim 2, wherein each of the second articulating self-aligning components apply the second force as a consolidation pressure distribution in order to consolidate a first polymer composite component and a second polymer composite component into one component.

4. The compliant consolidation block of claim 2, further comprising:

two third articulating self-aligning components coupled to each of the two second articulating self-aligning components, wherein each of the third articulating self-aligning components are individually configured to articulate with respect to a respective second articulating self-aligning component.

5. The compliant consolidation block of claim 4, wherein the second force applied by the first articulating self-aligning component is divided by each of the second articulating self-aligning components such that a third force is applied to each of the third articulating self-aligning components, the third force being half of the second force or a quarter of the first force.

6. The compliant consolidation block of claim 1, wherein the non-articulating component includes a recess, wherein the first articulating self-aligning component comprises a protruding portion, and wherein the protruding portion of the first articulating self-aligning component is received within the recess of the non-articulating component.

7. The compliant consolidation block of claim 6, wherein the pin protrudes through a first of the voids, through the protruding portion of the first articulating self-aligning component, and through a second of the voids.

8. The compliant consolidation block of claim 1, wherein each of the second articulating self-aligning components are individually coupled to the first articulating self-aligning component via a pin that is configured to slide within the confines of voids in the first articulating self-aligning component.

9. The compliant consolidation block of claim 8, wherein the first articulating self-aligning component includes a recess for each of the second articulating self-aligning components, wherein each of the second articulating self-aligning components comprise a protruding portion, wherein the protruding portion of each of the second articulating self-aligning components is received within a respective recess of the first articulating self-aligning component.

10. An ultrasonic welder, the ultrasonic welder comprising:

a roller;

a sonotrode; and a compliant consolidation block, the compliant consolidation block comprising:

a non-articulating component;

a first articulating self-aligning component coupled to the non-articulating component, wherein the first articulating self-aligning component is configured to articulate with respect to the non-articulating component and wherein the first articulating self-aligning component is coupled to the non-articulating component via a pin that is configured to slide within the confines of voids in the non-articulating component; and two second articulating self-aligning components coupled to the first articulating self-aligning component, wherein each of the two second articulating self-aligning components are individually configured to articulate with respect to the first articulating self-aligning component.

11. The ultrasonic welder of claim 10, wherein a first force applied by the non-articulating component is divided by the first articulating self-aligning component such that a second force is applied to each of the second articulating self-aligning components, the second force being half of the first force.

12. The ultrasonic welder of claim 11, wherein each of the second articulating self-aligning components apply the second force as a consolidation pressure distribution in order to consolidate a first polymer composite component and a second polymer composite component into one component.

13. The ultrasonic welder of claim 11, wherein the compliant consolidation block further comprises:

two third articulating self-aligning components coupled to each of the two second articulating self-aligning components, wherein each of the third articulating self-aligning components are individually configured to articulate with respect to a respective second articulating self-aligning component.

14. The ultrasonic welder of claim 13, wherein the second first force applied by the first articulating self-aligning component is divided by each of the second articulating self-aligning components such that a third force is applied to each of the third articulating self-aligning components, the third force being half of the second force or a quarter of the first force.

15. The ultrasonic welder of claim 10, wherein the non-articulating component includes a recess, wherein the first articulating self-aligning component comprises a protruding portion, and wherein the protruding portion of the first articulating self-aligning component is received within the recess of the non-articulating component.

16. The ultrasonic welder of claim 15, wherein the pin protrudes through a first of the voids, through the protruding portion of the first articulating self-aligning component, and through a second of the voids.

17. The ultrasonic welder of claim 10, wherein each of the second articulating self-aligning components are individually coupled to the first articulating self-aligning component via a pin that is configured to slide within the confines of voids in the first articulating self-aligning component.

18. The ultrasonic welder of claim 17, wherein the first articulating self-aligning component includes a recess for each of the second articulating self-aligning components, wherein each of the second articulating self-aligning components comprise a protruding portion, wherein the protruding portion of each of the second articulating self-aligning components is received within a respective recess of the first articulating self-aligning component.

* * * * *